Patented Feb. 17, 1948

2,436,151

UNITED STATES PATENT OFFICE 2,436,151

ALKYLATION OF AROMATIC HYDROCARBONS BY CONTACT WITH HEAT-STABLE METAL HALIDE CATALYSTS

Arlie A. O'Kelly, Woodbury, N. J., and Robert H. Work, Philadelphia, Pa., assignors to Socony-Vacuum Oil Company, Incorporated, a corporation of New York No Drawing. Application December 17, 1942, Serial No. 469,362

12 Claims. (Cl. 260—671)

This invention relates to the ring alkylation of aromatic hydrocarbons, as well as other aromatic compounds. The invention is concerned particularly with the manufacture of mono-ethyl benzene even though its scope is much broader as indicated above.

Alkylation of aromatic compounds with olefins or alkyl halides, etc., is well known and various catalysts have been proposed for such reactions, as, for example, sulfuric acid, aluminum chloride, zinc chloride, zirconium chloride, and phosphoric acid. These catalysts effect alkylation of aromatic hydrocarbons with ethylene in addition to alkylation with the higher and more reactive olefins. These previously known alkylation reactions are unsatisfactory in that the yield of any definite compound is low. Some catalysts, such as phosphoric acid, also act as polymerization catalysts for the alkylating agent. Others give low yields of total alkylated aromatics, while some catalysts producing extensive alkylation result in a product containing mono- to hexa-alkyl aromatics (or higher with multiple ring compounds) wherein no single compound predominates.

According to this invention, aromatic materials, i. e., aromatic hydrocarbons, substituted aromatics and mixtures thereof, are alkylated selectively to produce alkyl aromatics predominating in mono- and di- substituted derivatives. The invention contemplates the provision of catalysts effecting the reaction of olefins with aromatic materials to produce predominantly mono- and di- alkyl aromatics. A further object of the invention resides in avoiding the difficulties of the prior art due to polymerization of olefins employed for alkylation and/or low yields of the desired product arising from other causes.

We have found that when olefins are reacted with aromatic materials in the presence of a catalyst comprising zinc chloride, ferric chloride, or other metal halide stable at reaction temperature, and a halogenated organic compound, high yields consisting predominantly of mono- and di- substituted aromatics are obtained. Preferably the catalyst consists essentially of the two components noted above and the halogenated aliphatic compounds and mixtures are preferred. For reasons of economy and availability the chlorine derivatives are found most satisfactory. The process is best practiced at superatmospheric temperatures, generally not substantially below 550° F., and superatmospheric pressures, for example 1500 to 2000 pounds gauge. Temperatures around 600° F. give excellent yields.

The metal halides having very high catalytic activity in the Friedel-Crafts reaction, such as aluminum chloride, are unstable at the reaction temperature and are not suited to the purposes of the reaction because they induce reactions other than that desired which tend to give large amounts of undesired by-product and low yields of the desired lower alkylated benzenes.

Experimental evidence shows a marked advantage in the combined catalyst, the zinc chloride, ferric chloride, or other metal halide being advantageously supported on a carrier such as silica gel.

Example I

A charge consisting of 865 grams of benzene and 224 grams of mixed amylenes was reacted at 599° F. and 1700 pounds pressure for 30 minutes in the presence of 12 grams of chloroform and 35 grams of zinc chloride on 65 grams of silica gel. That portion of the reacted mass boiling above 95° C. was taken as amyl benzenes and yielded the following fractions:

| Cut | Weight | Specific Gravity |
|---|---|---|
| | Grams | |
| 95–160° C | None | |
| 160–210° C | 205.0 | 0.864 |
| 210–230° C | 25.0 | 0.884 |
| 230–270° C | 40.0 | 0.908 |
| 270–300° C | 12.0 | 0.940 |
| Residue | 16.0 | |

Most of the 160–210° C. cut boiled at 200° C. and this, in view of the specific gravity, shows it to be largely pure mono-amyl benzene.

Example II

Similarly good results were obtained using ethylene instead of amylene. Reaction of 865 grams of benzene with 92 grams of ethylene in the presence of the catalyst of Example I at 617° F. and 1500 pounds gauge for 30 minutes gave 226.0 grams of product found to be 74.3% mono-ethyl benzene and 25.7% di-, tri-, and tetra-ethyl benzene.

Example III

When zinc chloride on silica gel was used as the catalyst in the absence of halogenated organic compounds at 617° F. and 1700 pounds gauge for 30 minutes, the product from 865 grams of benzene and 95 grams of ethylene was 148 grams. Of this product 66.2% was found to be mono-ethyl benzene, 16.8% di-ethyl benzene and 16.8% penta-ethyl benzene.

Example IV

Chloroform alone was found to cause no appreciable conversion.

Example V

Chlorinated naphtha was substituted for the chloroform of Example II, the mass reacted for 30 minutes at 617° F. and 1700 pounds gauge. The yield of 285.0 grams was found to be made up as follows:

| | Per cent |
|---|---|
| Ethyl benzene | 74.03 |
| Diethyl benzene | 14.39 |
| Triethyl benzene | 6.32 |
| Pentaethyl benzene | 5.26 |

Example VI

Ferric chloride was substituted for zinc chloride in Example I with substantially the same result. Similarly chlorides of cobalt, nickel and other thermally stable metal halides in amounts preferably around 1 to 2% based on total charge give good conversions.

We claim:

1. A process for alkylating aromatic hydrocarbons to produce predominantly monoalkyl and dialkyl aromatics, which comprises contacting an aromatic hydrocarbon with an olefinic hydrocarbon at a reaction temperature not substantially below 550° F., in the presence of a catalyst which includes a metal halide stable at the reaction temperature and a halogenated hydrocarbon.

2. A process for alkylating aromatic hydrocarbons to produce predominantly monoalkyl and dialkyl aromatics, which comprises contacting an aromatic hydrocarbon with an olefinic hydrocarbon at a reaction temperature not substantially below 550° F., in the presence of a catalyst which includes a metal halide stable at the reaction temperature and a halogenated aliphatic hydrocarbon.

3. A process for alkylating aromatic hydrocarbons to produce predominantly monoalkyl and dialkyl aromatics, which comprises contacting an aromatic hydrocarbon with an olefinic hydrocarbon at a reaction temperature not substantially below 550° F., in the presence of a catalyst which includes a metal halide stable at the reaction temperature and a chlorinated aliphatic hydrocarbon.

4. A process for alkylating aromatic hydrocarbons to produce predominantly monoalkyl and dialkyl aromatics hydrocarbons, which comprises contacting an aromatic hydrocarbon with an olefinic hydrocarbon at a reaction temperature not substantially below 550° F., in the presence of a catalyst which includes zinc chloride and a halogenated hydrocarbon.

5. A process for alkylating benzene to produce predominantly monoalkyl and dialkyl benzenes, which comprises contacting benzene with an olefinic hydrocarbon at a reaction temperature not substantially below 550° F., in the presence of a catalyst which includes zinc chloride and a halogenated aliphatic hydrocarbon.

6. A process for producing high yields of ethyl benzene, which comprises contacting benzene with ethylene at a reaction temperature not substantially below 550° F., in the presence of a catalyst which includes zinc chloride and a chlorinated aliphatic hydrocarbon.

7. A process for alkylating aromatic hydrocarbons to produce predominantly monoalkyl and dialkyl aromatics hydrocarbons, which comprises contacting an aromatic hydrocarbon with an olefinic hydrocarbon at a reaction temperature not substantially below 550° F., in the presence of a catalyst which includes ferric chloride and a halogenated hydrocarbon.

8. A process for alkylating benzene to produce predominantly monoalkyl and dialkyl benzenes, which comprises contacting benzene with an olefinic hydrocarbon at a reaction temperature not substantially below 550° F., in the presence of a catalyst which includes ferric chloride and a halogenated aliphatic hydrocarbon.

9. A process for producing high yields of ethyl benzene, which comprises contacting benzene with ethylene at a reaction temperature not substantially below 550° F., in the presence of a catalyst which includes ferric chloride and a chlorinated aliphatic hydrocarbon.

10. A process for alkylating aromatic hydrocarbons to produce predominantly monoalkyl and dialkyl aromatics hydrocarbons, which comprises contacting an aromatic hydrocarbon with an olefinic hydrocarbon at a reaction temperature not substantially below 550° F., in the presence of a catalyst which includes zinc chloride and chlorinated petroleum naphtha.

11. A process for alkylating benzene to produce predominantly monoalkyl and dialkyl benzenes, which comprises contacting benzene with an olefinic hydrocarbon at a reaction temperature not substantially below 550° F., in the presence of a catalyst which includes zinc chloride and chlorinated petroleum naphtha.

12. A process for producing high yields of ethyl benzene, which comprises contacting benzene with ethylene at a reaction temperature not substantially below 550° F., in the presence of a catalyst which includes zinc chloride and chlorinated petroleum naphtha.

ARLIE A. O'KELLY.
ROBERT H. WORK.

REFERENCES CITED

The following references are of record in the file of this patent:

UNITED STATES PATENTS

| Number | Name | Date |
|---|---|---|
| 2,009,108 | Egloff | July 23, 1935 |
| 2,244,512 | Brandt | June 3, 1941 |
| 2,324,784 | Lieber | July 20, 1943 |
| 2,361,065 | Schmerling et al. | Oct. 24, 1944 |
| 2,373,030 | Kimberlin | Apr. 3, 1945 |
| 2,402,847 | Schmerling et al. | June 25, 1946 |